US010273806B2

(12) United States Patent
Kondo et al.

(10) Patent No.: US 10,273,806 B2
(45) Date of Patent: Apr. 30, 2019

(54) NUT AND ROTARY MACHINE

(71) Applicant: MITSUBISHI HITACHI POWER SYSTEMS, LTD., Kanagawa (JP)

(72) Inventors: Takahiro Kondo, Tokyo (JP); Shinya Hashimoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 372 days.

(21) Appl. No.: 15/030,708

(22) PCT Filed: Oct. 24, 2014

(86) PCT No.: PCT/JP2014/078347
§ 371 (c)(1),
(2) Date: Apr. 20, 2016

(87) PCT Pub. No.: WO2015/064502
PCT Pub. Date: May 7, 2015

(65) Prior Publication Data
US 2016/0258292 A1    Sep. 8, 2016

(30) Foreign Application Priority Data

Oct. 29, 2013   (JP) .................................. 2013-224343

(51) Int. Cl.
*F01D 5/06* (2006.01)
*F16B 37/00* (2006.01)
(Continued)

(52) U.S. Cl.
CPC ............... *F01D 5/066* (2013.01); *F01D 5/06* (2013.01); *F01D 25/00* (2013.01); *F04D 29/321* (2013.01);
(Continued)

(58) Field of Classification Search
None
See application file for complete search history.

(56) References Cited

U.S. PATENT DOCUMENTS

| 4,245,959 A | * | 1/1981 | Carreno | .................. F01D 5/066 416/198 A |
| 4,453,889 A | * | 6/1984 | Sakata | ..................... F01D 5/066 416/198 A |

(Continued)

FOREIGN PATENT DOCUMENTS

| JP | 59-017313 | 2/1984 |
| JP | 1-92510 | 6/1989 |

(Continued)

OTHER PUBLICATIONS

International Search Report dated Jan. 20, 2015 in corresponding International Application No. PCT/JP2014/078347 (with English translation).

(Continued)

*Primary Examiner* — Jason D Shanske
*Assistant Examiner* — Theodore C Ribadeneyra
(74) *Attorney, Agent, or Firm* — Wenderoth, Lind & Ponack, L.L.P.

(57) ABSTRACT

Provided is a nut (12) configured to engage with an end portion on a first side of each of bolts (11) that pass through a plurality of rotary members in an axial direction at a plurality of locations in a circumferential direction having an axis (A) as the center thereof, the plurality of rotary members being stacked along the axial direction in which the axis (A) extends, the nut (12) comprising a first cover surface (35), which is the surface opposite a surface that faces a second side opposite the first side of the bolts (11), wherein, among all surfaces of the nut, at least the first cover surface (35) cooperates with the first cover surface (35) of another (Continued)

nut (12) to form a continuous annular surface with the axis (A) as the center thereof.

7 Claims, 10 Drawing Sheets

(51) Int. Cl.
 *F01D 25/00* (2006.01)
 *F04D 29/32* (2006.01)
 *F04D 29/64* (2006.01)
 *F01D 11/00* (2006.01)
 *F16B 33/00* (2006.01)

(52) U.S. Cl.
 CPC ............ *F04D 29/644* (2013.01); *F16B 37/00* (2013.01); *F01D 11/001* (2013.01); *F05D 2220/32* (2013.01); *F05D 2260/30* (2013.01); *F16B 33/002* (2013.01)

(56) References Cited

U.S. PATENT DOCUMENTS

| | | | | |
|---|---|---|---|---|
| 5,257,905 | A * | 11/1993 | Wynn | F01D 5/026 415/122.1 |
| 5,796,202 | A * | 8/1998 | Herron | F01D 5/066 310/216.127 |
| 5,860,789 | A * | 1/1999 | Sekihara | F01D 5/066 416/201 R |
| 6,053,701 | A * | 4/2000 | Ichiryu | F01D 5/084 415/115 |
| 6,231,287 | B1 * | 5/2001 | Herron | F01D 5/066 411/104 |
| 6,267,553 | B1 * | 7/2001 | Burge | F01D 5/06 415/115 |
| 7,114,915 | B2 * | 10/2006 | Uematsu | F01D 5/084 415/115 |
| 9,222,369 | B2 * | 12/2015 | Mulcaire | F01D 25/243 |
| 2004/0007830 | A1 * | 1/2004 | Uematsu | F01D 5/066 277/628 |
| 2004/0234371 | A1 * | 11/2004 | Palmer | F01D 5/026 415/124.2 |
| 2005/0013679 | A1 * | 1/2005 | Ladoucer | B23P 19/062 411/180 |
| 2005/0020367 | A1 * | 1/2005 | Dao | F04D 19/02 470/2 |
| 2005/0238423 | A1 * | 10/2005 | Maffre | F01D 5/066 403/408.1 |
| 2006/0245925 | A1 * | 11/2006 | Brault | F01D 5/027 416/144 |
| 2007/0237601 | A1 * | 10/2007 | Agg | F16B 39/101 411/92 |
| 2011/0268579 | A1 * | 11/2011 | Light | F04D 29/054 416/244 A |
| 2016/0010481 | A1 * | 1/2016 | Gurao | F01D 5/066 415/134 |

FOREIGN PATENT DOCUMENTS

| | | |
|---|---|---|
| JP | 5-58929 | 8/1993 |
| JP | 8-42540 | 2/1996 |
| JP | 2001-323820 | 11/2001 |
| JP | 2002-235501 | 8/2002 |

OTHER PUBLICATIONS

Written Opinion of the International Searching Authority dated Jan. 20, 2015 in corresponding International Application No. PCT/JP2014/078347 (with English translation).

* cited by examiner

FIG. 11 ical Field

The present invention relates to a nut configured to engage with each of bolts for fastening together a plurality of rotary members, and a rotary machine assembled using the nut.

This application claims priority based on Japanese Patent Application No. 2013-224343 filed in Japan on Oct. 29, 2013, of which the contents are incorporated herein by reference.

BACKGROUND ART

Gas turbine rotors with a configuration including a plurality of disks are known. In the disks, a plurality of through-holes extending in the direction parallel to the axis of the rotor are formed in the circumferential direction of the rotor. The disks are fastened together by spindle bolts and nuts. In such a rotor, a cavity for attaching nuts is formed (for example, see Patent Document 1).

Even greater efficiency is desired for gas turbines. In gas turbines, for example, elimination of even the minute windage loss generated when the rotor rotates is demanded.

Patent Document 1 describes a structure in which the working fluid is prevented from flowing inside the cavity by disposing a seal member fixed by a spindle bolt in the cavity. Specifically, this structure reduces windage loss by reducing the amount of working fluid flowing into the cavity and consequently enhances the efficiency of the gas turbine.

CITATION LIST

Patent Document

Patent Document 1: Japanese Unexamined Patent Application Publication No. 2001-323820A

SUMMARY OF INVENTION

Technical Problem

However, while the structure described in Patent Document 1 seals the cavity with nuts disposed therein to a certain degree, some working fluid flows into the space through the seal member. Then, the working fluid that has flowed into the cavity generates a swirl within the cavity. When this swirl comes into contact with the nut, windage loss is generated between the nut and the working fluid around the nut. This has the effect of raising the ambient temperature around the nut. As a result, the efficiency of the gas turbine decreases.

An object of the present invention is to provide a nut configured to engage with each of bolts for fastening together a plurality of rotary members, the nut being capable of reducing windage loss between the nut and the fluid around the nut, and a rotary machine using the nut.

Solution to Problem

According to a first aspect of the present embodiment, a nut is configured to engage with an end portion on a first side of each of bolts that pass through a plurality of rotary members in an axial direction at a plurality of locations in a circumferential direction having an axis as the center thereof, the plurality of rotary members being stacked along the axial direction in which the axis extends, the nut comprising a first cover surface, which is the surface opposite a surface that faces a second side opposite the first side of the bolts, wherein, among all surfaces of the nut, at least the first cover surface cooperates with the first cover surface of another nut to form a continuous annular surface with the axis as the center thereof.

According to the configuration described above, the amount of fluid flowing in between the nuts when the rotary member rotates is reduced by the annular surface formed by the plurality of nuts. As a result, windage loss between the nuts and the fluid around the nuts can be reduced.

The nut described above may have a configuration in which the nut comprises a nut body comprising a screw hole, and a plate-like cover portion configured to be attached to the nut body, the cover portion corresponding to the first cover surface.

According to the configuration described above, the weight of the nut can be reduced by forming the section that constitutes the first cover surface as a plate.

The nut described above may have a configuration in which the first cover surface is flat.

According to the configuration described above, the fluid around the nut can flow smoothly. As a result, windage loss can be further reduced.

The nut described above may have a configuration in which the first cover surface is perpendicular to the axis.

According to the configuration described above, turning up of the cover surface due to centrifugal force that acts upon the cover surface when the rotary member rotates can be prevented.

The nut described above may have a configuration in which, among all the surfaces, an outer cover surface, which is the surface facing the outer side with respect to the axis, cooperates with the outer cover surface of another nut to form a continuous annular surface with the axis as the center thereof.

According to the configuration described above, the amount of fluid flowing from the outer peripheral side in the radial direction in between the nuts when the rotary member rotates is reduced. As a result, windage loss between the nuts and the fluid around the nuts can be reduced.

The nut described above may have a configuration in which, among all the surfaces, an inner cover surface, which is the surface facing the inner side with respect to the axis, cooperates with the inner cover surface of another nut to form a continuous annular surface with the axis as the center thereof.

According to the configuration described above, the amount of fluid flowing from the inner peripheral side in the radial direction in between the nuts when the rotary member rotates is reduced. As a result, windage loss between the nuts and the fluid around the nuts can be reduced.

The nut described above may have a configuration in which the nut is formed to have planar symmetry with respect to a plane including the axis and a central axis of the screw hole.

According to the configuration described above, loosening due to centrifugal force when the nut rotates about the axis can be prevented.

The nut described above may have a configuration further comprising a plurality of screw holes configured to engage with the end portions of the bolts on the first side.

According to the configuration described above, the number of gaps between the cover surfaces that form the continuous annular surface is reduced. As a result, the amount of working fluid flowing in between the nuts can be further reduced.

In addition, the present invention provides a rotary machine comprising a rotor, the rotor comprising a plurality of the rotary members, a plurality of the bolts, and a plurality of the nuts of any one of the configurations described above, wherein the plurality of the rotary members are fastened together by the plurality of the bolts and the plurality of the nuts.

According to the configuration described above, the amount of fluid flowing in between the nuts when the rotary machine operates is reduced. As a result, windage loss between the nuts and the fluid around the nuts can be reduced.

Advantageous Effects of Invention

According to the present invention, the amount of fluid flowing in between the nuts when the rotor rotates is reduced by the annular member formed by the plurality of nuts. As a result, the windage loss between the nuts and the fluid around the nuts can be reduced.

DESCRIPTION OF EMBODIMENTS (First Embodiment)
The following describes in detail embodiments of the present invention, with reference to the drawings.

Figure 1:
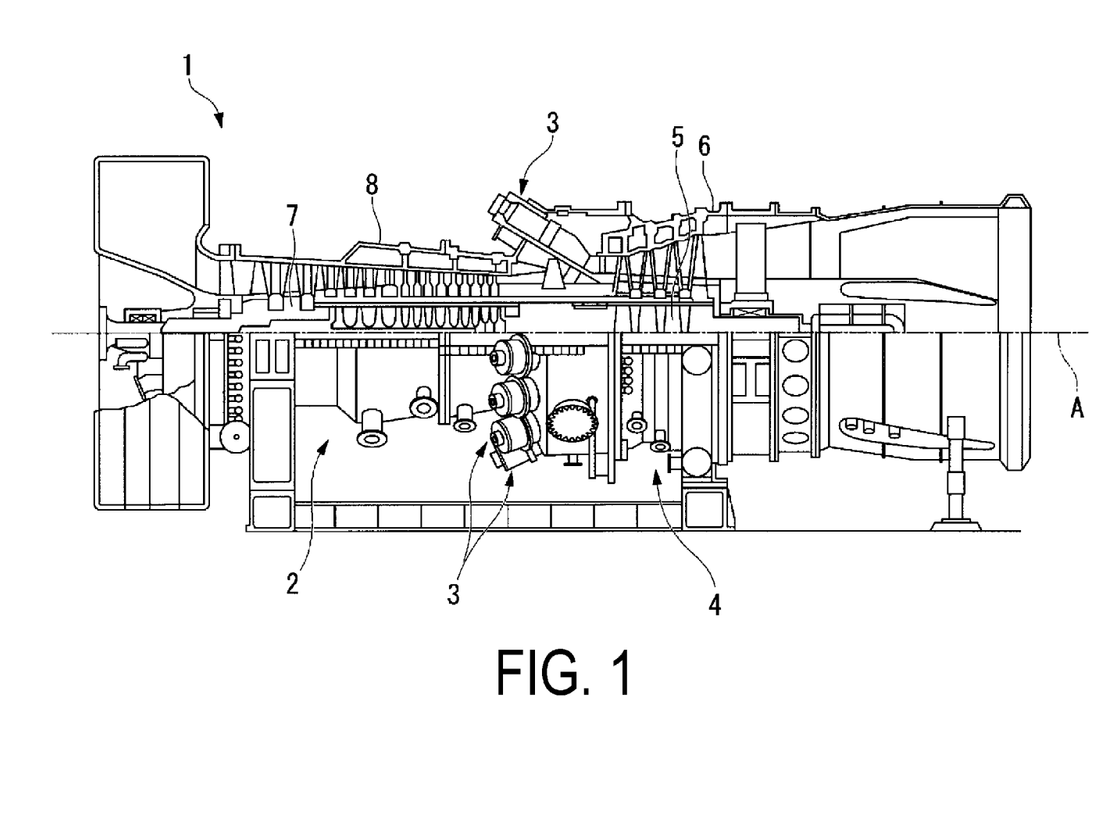
FIG. 1 is a cutaway side view illustrating the main portion of a gas turbine of a first embodiment according to the present invention.

As illustrated in FIG. 1, a gas turbine 1 includes a compressor 2 that compresses outside air to generate compressed air, a combustor 3 that mixes a fuel from a fuel supply source with the compressed air and combusts the mixture to generate a combustion gas, and a turbine 4 that is driven by the combustion gas.

The turbine 4 is a rotary machine that includes a turbine rotor 5, which is a rotor rotating about an axis A, and a turbine casing 6 which covers the turbine rotor 5 allowing the turbine rotor 5 to rotate.

The compressor 2 is also a rotary machine that includes a compressor rotor 7, which is a rotor rotating about the axis, and a compressor casing 8 which covers the compressor rotor 7 allowing the compressor rotor 7 to rotate.

Note that in the description below, the direction in which the axis A of the turbine rotor 5 and the compressor rotor 7 extends is referred to as "axial direction", and the radial direction from the axis A is referred to as simply "radial direction". In addition, in the axial direction, the compressor 2 side with respect to the turbine 4 is referred to as "first side", and the turbine 4 side with respect to the compressor 2 is referred to as "second side" (the side opposite the first side).

Figure 2:
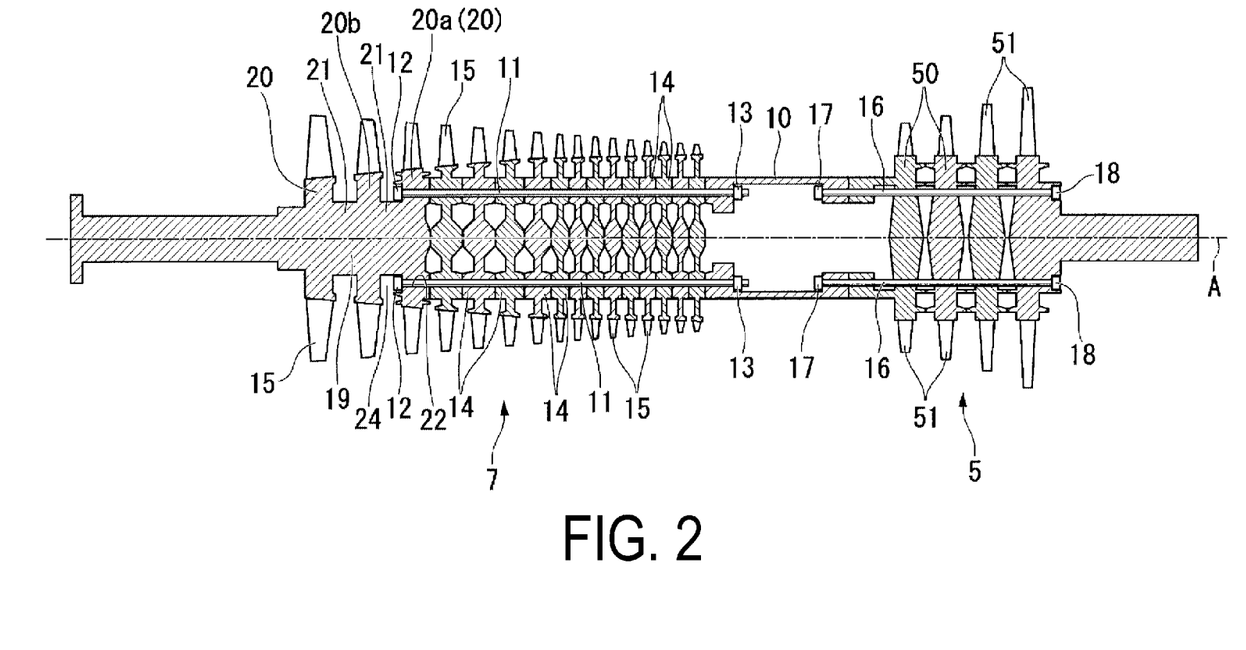
FIG. 2 is a cross-sectional view illustrating a rotor of the gas turbine of the first embodiment according to the present invention.

As illustrated in FIG. 2, the compressor rotor 7 and the turbine rotor 5 are integrally coupled via an intermediate shaft 10. The compressor rotor 7 is constituted by an integral disk 19, a plurality of disks 14, and compressor blades 15 fixed to the plurality of disks 14. The integral disk 19 and the plurality of disks 14 are rotary members fastened together by spindle bolts 11 (fastening bolts for gas turbines) and nuts 12, 13.

In other words, the compressor rotor 7 has a configuration in which the plurality of disks 14, 19 stacked in the axial direction along the axis A are fastened by the spindle bolts 11 that pass through the plurality of disks 14, 19 at a number of positions in the circumferential direction with the axis A as the center thereof, and the nuts 12, 13 that engage with both ends of the spindle bolts 11.

The spindle bolts 11 are disposed at roughly even intervals in the circumferential direction. The compressor rotor 7 of the present embodiment is fastened by twelve spindle bolts 11. Specifically, the spindle bolts 11 are provided at 30-degree intervals about the axis A, for example.

In a similar manner to the compressor rotor 7, the turbine rotor 5 is constituted by a plurality of turbine disks 50 fastened by spindle bolts 16 and nuts 17, 18 and turbine blades 51 fixed to the turbine disks 50.

Here, a nut (spindle nut) refers to a component used in combination with a male threaded component, such as a bolt like a spindle bolt, and is a fastening component formed with a female thread capable of engaging with the male thread of the bolt.

The compressor rotor 7 has a structure in which some of the plurality of disks 14 on the front stage side of the compressor rotor 7 are not stacked but integrated as the integral disk 19 to increase rigidity. The integral disk 19 of the compressor rotor 7 is fastened to the plurality of disks 14 positioned on the rear stage side of the compressor rotor 7 by the spindle bolts 11 and the nuts 12, 13 that engage with both ends of the spindle bolts 11.

The integral disk 19 includes a plurality of large diameter portions 20 to which the compressor blades 15 are fixed, and a small diameter portion 21 disposed between the large diameter portions 20 and having a smaller diameter than the large diameter portions 20. The integral disk 19 of the present embodiment includes three large diameter portions 20 and two small diameter portions 21.

The spindle bolts 11 and the nuts 12, 13 engage together to fasten together the plurality of disks 14, the integral disk 19 positioned on the first side of the plurality of disks 14 in the axial direction, and the intermediate shaft 10 positioned on the second side of the plurality of disks 14 in the axial direction. Bolt through-holes 22 for inserting the spindle bolts 11 are formed at even intervals in the circumferential direction in the plurality of disks 14, the integral disk 19, and the intermediate shaft 10.

In the compressor rotor 7 of the present embodiment, nuts with cover 12 are engaged with the end portions of the spindle bolts 11 on the first side (the side of the integral disk 19), and typical nuts 13 are engaged with the end portions of the spindle bolts 11 on the second side (the side of the intermediate shaft 10), which is the side opposite the first side.

The integral disk 19 includes bolt through-holes 22 formed only on the large diameter portion 20 on the side abutting the plurality of disks 14 (hereinafter, referred to as "first large diameter portion 20a"). Specifically, the integral disk 19 is fastened to the plurality of disks 14 via the first large diameter portion 20a on the second side in the axial direction.

The nuts with cover 12 engage with one end portions of the spindle bolts 11 exposed in a cavity 24 between the first large diameter portion 20a on the second side in the axial direction and the large diameter portion 20 central in the axial direction (hereinafter, referred to as "second large diameter portion 20b").

Figure 3:
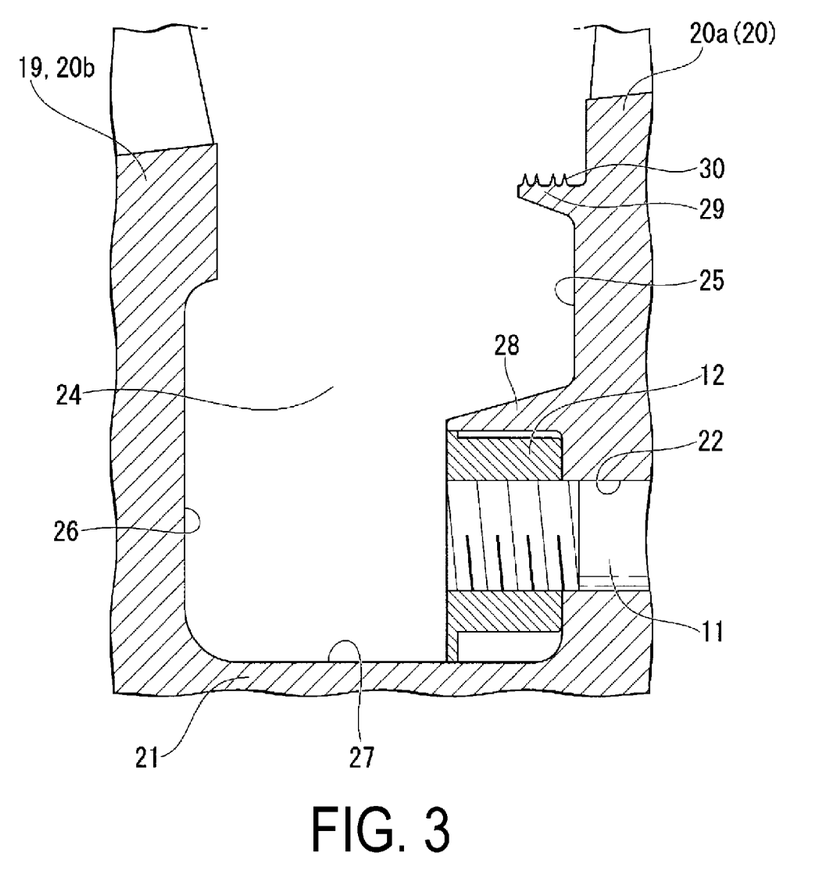
FIG. 3 is a cross-sectional view illustrating a cavity of an integral disk of the rotor of the first embodiment according to the present invention.

As illustrated in FIG. 3, the cavity 24 is a space formed by a surface on the first side of the first large diameter portion 20a in the axial direction (hereinafter, referred to as "first side surface 25"), a surface on the second side of the second large diameter portion 20b in the axial direction (hereinafter, referred to as "second side surface 26"), and an outer peripheral surface of the small diameter portion 21 between the first large diameter portion 20a and the second large diameter portion 20b (hereinafter, referred to as "small diameter portion outer peripheral surface 27").

The bolt through-holes 22 are formed on the inner side of the first side surface 25 of the cavity 24 in the radial direction. In other words, the bolt through-holes 22 are formed in a manner such that the spindle bolts 11 can be disposed as close to the inner side in the radial direction as possible. Specifically, the nuts with cover 12 are disposed approximate to the bottom portion of the cavity 24.

A nut-retaining protrusion 28 is formed on the first side surface 25 of the cavity 24. The nut-retaining protrusion 28 protrudes from the first side surface 25 toward the first side in the axial direction and extends in the circumferential direction. The nut-retaining protrusion 28 is formed so as to come into contact with the radially outer peripheral side of the nut with cover 12 upon the nut with cover 12 being attached to the spindle bolt.

In addition, a seal fin protrusion 29 is formed on the first side surface 25 of the cavity 24. The seal fin protrusion 29 cooperates with a seal member 54 formed on the inner peripheral surface of an inner shroud 53 of a compressor vane 52 (see FIG. 6) to prevent the inflow of working fluid such as air. A plurality of seal fins 30 are formed in the seal fin protrusion 29. The seal fins 30 protrude to the radially outer side of the seal fin protrusion 29 and extend in the circumferential direction.

Figure 4:
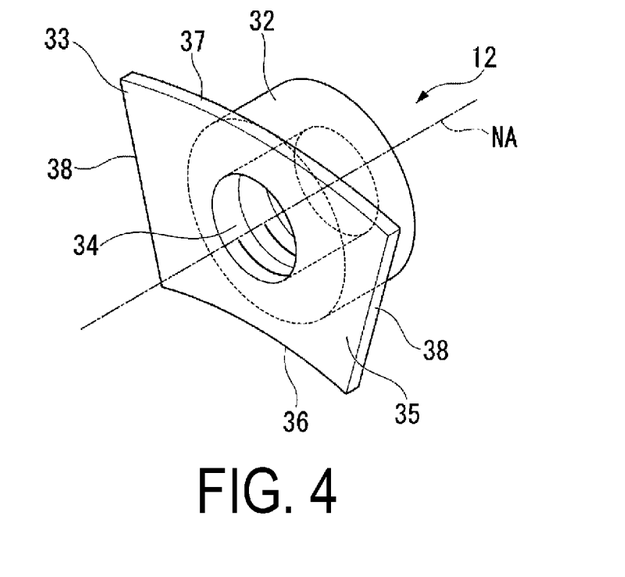
FIG. 4 is a perspective view illustrating a nut with cover of the first embodiment according to the present invention.

As illustrated in FIG. 4, the nut with cover 12 includes a cylindrical nut body 32 and a plate-like cover portion 33 provided on one end of the nut body 32 in the axial direction. A screw hole 34 is provided in the nut with cover 12 passing through the nut body 32 and the cover portion 33.

The nut body 32 is cylindrical and the screw hole 34 is formed so as to be coaxial with the nut body 32. Specifically, the screw hole 34 is formed such that a central axis NA of the screw hole 34 is aligned with the central axis of the cylindrical nut body 32. The inner peripheral surface of the screw hole 34 is female threaded to receive the spindle bolts 11.

The cover portion 33 is a planar member integrally provided on the first side of the nut body 32 in the axial direction. When the nut with cover 12 is attached to the spindle bolts 11, the cover portion 33 is disposed on the first side in the axial direction. The surface of the cover portion 33 on the side (the first side in the axial direction) opposite the side where the nut body 32 is disposed (hereinafter, referred to as "first cover surface 35") is flat. In addition, the first cover surface 35 is formed to be perpendicular to the axis A.

The shape of the cover portion 33 when viewed from the axial direction is a sector-like shape with a circular arc thereof concentric with the compressor rotor 7.

The contour of the cover portion 33 is constituted by a first circular arc 36, a second circular arc 37, and straight line portions 38. The first circular arc 36 is an arc that follows the small diameter portion outer peripheral surface 27 of the cavity 24 when the nut with cover 12 is engaged with the spindle bolt 11. The second circular arc 37 is an arc that follows the inner peripheral surface of the nut-retaining protrusion 28. The straight line portions 38 are straight lines that connect both ends of the first circular arc 36 and the second circular arc 37.

In addition, the nut body 32 and the cover portion 33 are formed such that the central axis of the nut body 32 is aligned with the circumferential center of the cover portion 33. Specifically, the screw hole 34 of the nut with cover 12 is centrally formed in the first cover surface 35.

Figure 5:
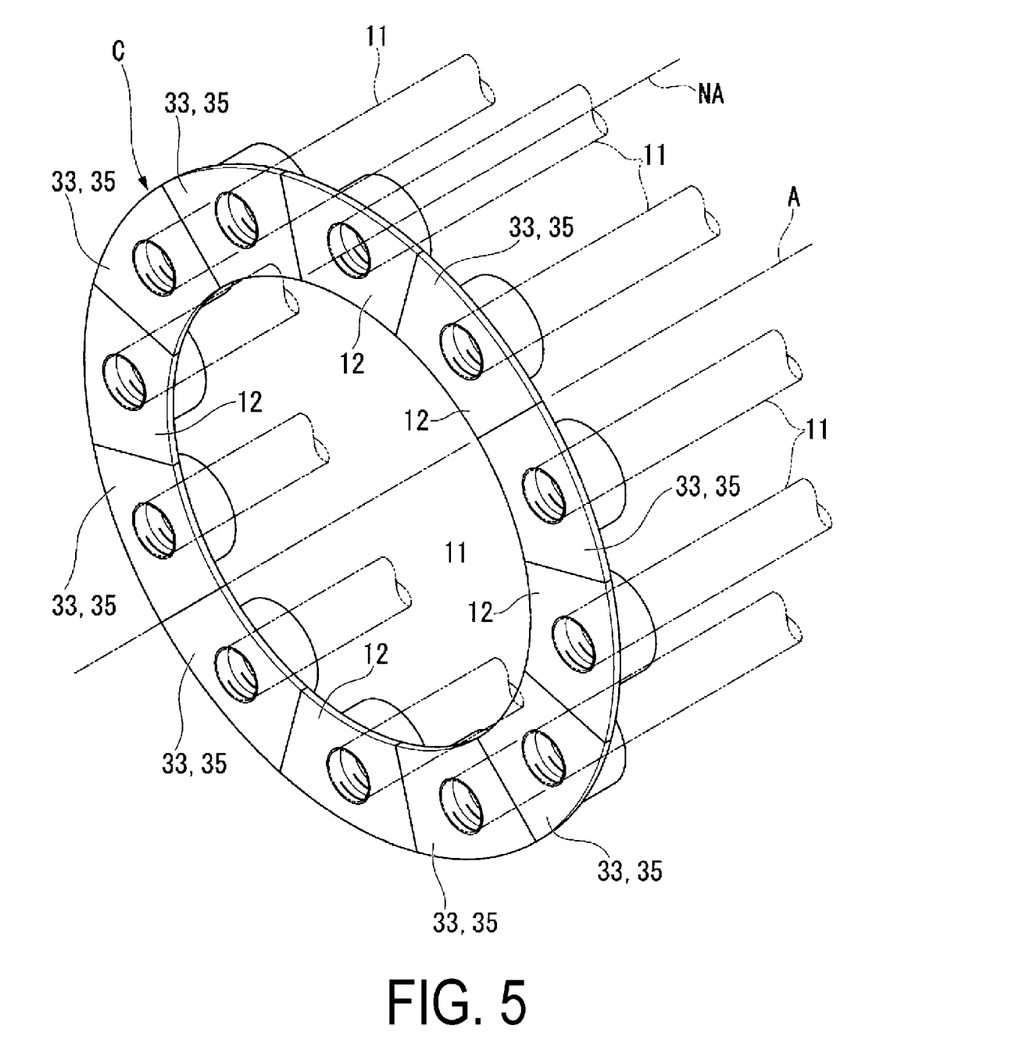
FIG. 5 is a perspective view illustrating a state in which spindle bolts and the nuts with cover of the first embodiment according to the present invention are arranged in the circumferential direction.

As illustrated in FIG. 5, the cover portions 33 of the nuts with cover 12 form an annular member C with the axis A of the compressor rotor 7 as the center thereof upon the nut with cover 12 being attached to each of the twelve spindle bolts 11 of the present embodiment. In other words, the cover portions 33 (the cover surfaces 35) have a shape of divisions in the circumferential direction of the surface of the annular member C with the axis A of the compressor rotor 7 as the center thereof. Specifically, the first cover surface 35 cooperates with the first cover surfaces 35 of other nuts with cover 12 to form a continuous annular surface with the axis A as the center thereof.

In addition, the nuts with cover 12 are formed to have planar symmetry with respect to the plane including the axis A and the central axis NA of the screw hole 34.

The cover portion 33 of the present embodiment has a sector-like shape with a central angle of 30 degrees (360 degrees/12).

The configuration, however, does not depend upon the number of spindle bolts 11, and for example, in the case of N number of spindle bolts 11 being provided, N number of cover portions 33 come together to form the continuous annular member C as a whole. Specifically, the central angle of the sector-like shape of the cover portion 33 is 360 degrees/N degrees.

The nut with cover 12 of the present embodiment is integrally formed, for example, by a process of cutting steel material such as stainless steel. However, the nut body 32 and the cover portion 33 may also be formed separately and then integrated by welding if sufficient bonding strength between the nut body 32 and the cover portion 33 can be ensured.

When assembling the compressor rotor 7, the integral disk 19, the plurality of disks 14, and the intermediate shaft 10 are disposed, followed by the nuts with cover 12 being disposed at prescribed positions in the cavity 24. Thereafter, the spindle bolts 11 are inserted from the second side in the axial direction, and the nuts with cover 12 and the end portions of the spindle bolts 11 on the first side in the axial direction are engaged with one another. In this case, the surface on the second side in the axial direction of the nut body 32 of the nut with cover 12 is disposed so as to contact the first side surface 25 of the cavity 24.

Next, the nuts 13 are engaged with the end portions of the spindle bolts 11 on the second side in the axial direction. As a result, the integral disk 19, the plurality of disks 14, and the intermediate shaft 10 are fastened together. Thus, during fastening, the nuts with cover 12 are not rotated.

Hereinafter, the operation of the nut with cover 12 of the present embodiment is described.

Figure 6:
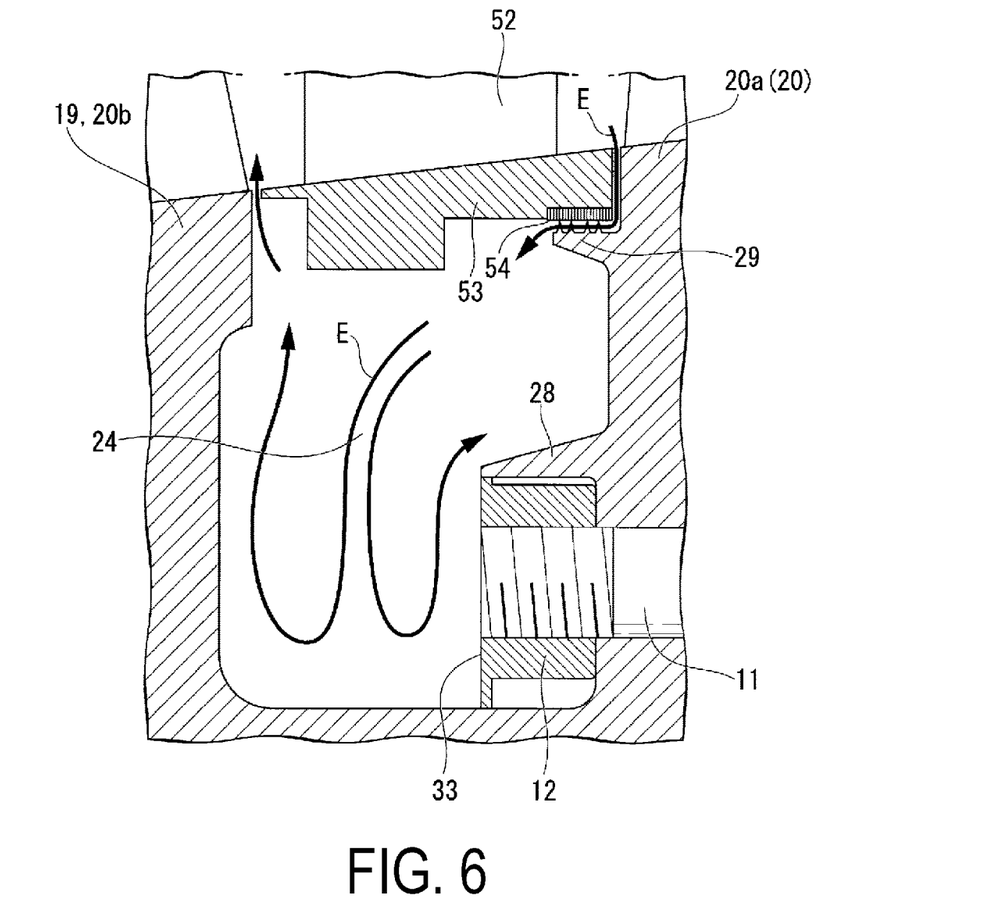
FIG. 6 is a cross-sectional view illustrating the cavity for describing the effect of the nut of the first embodiment according to the present invention.

As illustrated in FIG. 6, upon initiation of the operation of the compressor 2, working fluid flows inside the cavity 24 from an axial gap between the inner shroud 53 of the compressor vane 52 and the second large diameter portion 20b of the integral disk 19. The working fluid forms a swirl E inside the cavity 24.

Inside the cavity 24, because the cover portion 33 is provided on the nut with cover 12, which is the nut engaged with the end portion of the spindle bolt 11 on the first side, the working fluid does not flow into the region where the nut with cover 12 is disposed. Specifically, entrainment of the working fluid around the spindle bolt 11 and the nut with cover 12 is reduced.

In other words, the nut body 32 of the nut with cover 12 does not interfere with the working fluid due to the annular member C that is formed by the cover portions 33 of the nuts with cover 12 being respectively attached to the twelve spindle bolts 11.

According to the embodiment described above, the amount of working fluid flowing in between the nut bodies 32 when the compressor rotor 7 rotates can be reduced by the annular member C formed by the plurality of nuts with cover 12. As a result, windage loss between the nut body 32 and the fluid around the nut with cover 12 can be reduced.

In addition, because the first cover surface 35 is flat, the working fluid around the nut with cover 12 can flow smoothly. As a result, windage loss can be further reduced.

Moreover, because the first cover surface 35 is perpendicular to the axis A, turning up of the cover portion 33 due to centrifugal force that acts upon the cover portion 33 when the compressor rotor 7 rotates can be prevented.

Furthermore, the nut with cover 12 includes the nut body 32 with the screw hole 34 and the plate-like cover portion 33 attached to the nut body 32, And the cover portion 33 forms the first cover surface 35. As a result of this configuration, the weight of the nut 12 can be reduced.

In addition, the screw hole 34 of the nut with cover 12 is centrally formed in the first cover surface 35, and the nut with cover 12 is formed to have planar symmetry with respect to the plane including the axis A and the central axis NA of the screw hole 34. Consequently, the balance of weight of the cover portion 33 with respect to the screw hole 34 corresponding to the rotation center of the nut with cover 12 can be enhanced. As a result, inadvertent rotation of the nut with cover 12 when the compressor rotor 7 rotates can be prevented.

Moreover, even in cases in which a process of embedding the nut in the first side surface 25 (i.e. counterboring) for reducing exposure of the nut attached to the end portion of the spindle bolt 11 on the first side is difficult, windage loss due to the nut can be reduced.

Furthermore, centrifugal force acting upon the nut with cover 12 can be minimized by the nut-retaining protrusion 28 formed on the first side surface 25 of the cavity 24. In addition, the amount of working fluid flowing in around the nut with cover 12 from the outer peripheral side in the radial direction can be reduced.

Note that in the description above, the continuous annular member C is formed with no gaps between adjacent cover portions 33 upon the nuts with cover 12 being attached to the spindle bolts 11. However, predetermined gaps may be formed between the cover portions 33. That is, the annular member C formed by the cover portions 33 is not required to be perfectly continuous.

(Modification of First Embodiment)

Figure 7:
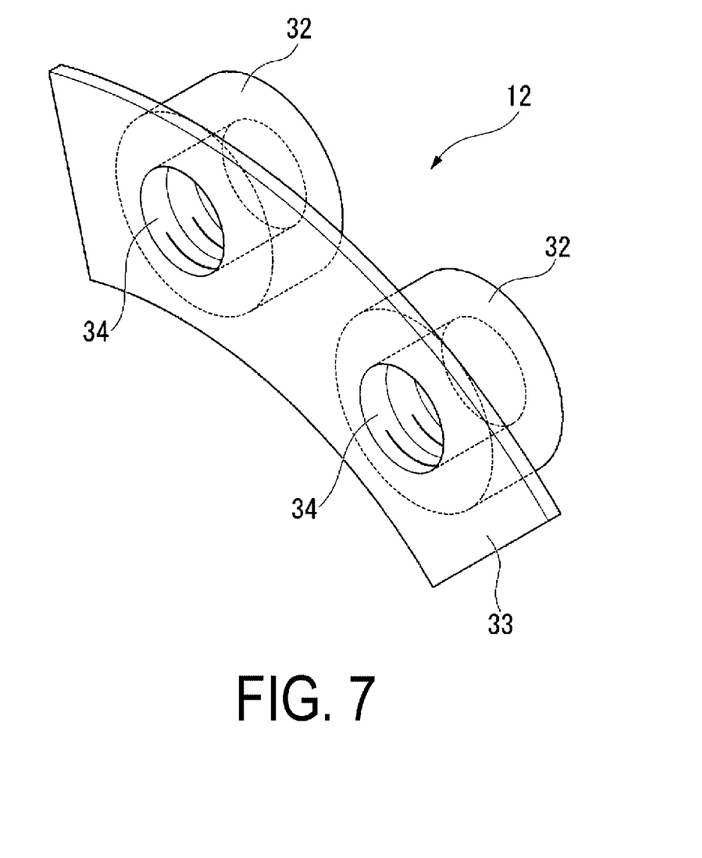
FIG. 7 is a perspective view illustrating a nut with cover of a modification of the first embodiment according to the present invention.

Here, a modification of the first embodiment is described. As illustrated in FIG. 7, the nut with cover 12 of the modification of the first embodiment has a configuration in which two nut bodies 32 are formed in one cover portion 33. Specifically, the nut with cover 12 of the present modification has a shape including two screw holes 34 for receiving two spindle bolts 11 adjacent to each other in the circumferential direction.

In the case of a configuration in which N number of spindle bolts 11 are provided in the circumferential direction, the cover portions 33 of the present modification have a shape of N/2 number of divisions in the circumferential direction of an annular member with the axis of the compressor rotor 7 as the center thereof.

According to this modification, the number of gaps between the cover portions 33 is reduced. As a result, the amount of working fluid flowing in toward the nut body 32 side of the nut with cover 12 can be further reduced.

Note that in this modification, an example of two nut bodies 32 integrated with one cover portion 33 is described. However, the modification is not limited thereto and may have a configuration in which three or more nut bodies 32 are integrated with one cover portion 33.

(Second Embodiment)

Hereinafter, a nut with cover 12B of a second embodiment of the present invention is described with reference to the drawings. Note that, in the present embodiment, points that are different from the above-described first embodiment will be mainly described, and a description will be omitted of the portions that are the same.

Figure 8:
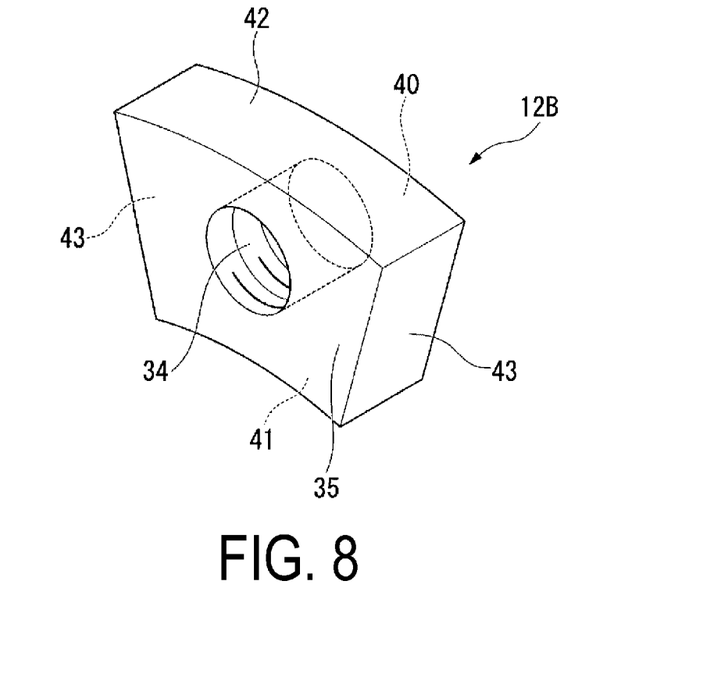
FIG. 8 is a perspective view illustrating a nut with cover of a second embodiment according to the present invention.

As illustrated in FIG. 8, the nut with cover 12B of the present embodiment has a block-like form with a sector-like shape similar to that of the cover portion 33 of the first embodiment when viewed in the axial direction. Specifically, the nut with cover 12B of the present embodiment is constituted by the cover surface 35, an opposite surface 40, a first circular arcuate surface 41, a second circular arcuate surface 42, and contact surfaces 43.

The opposite surface 40 is the surface opposite the cover surface 35 on the second side in the axial direction. The first circular arcuate surface 41 is the surface that faces the small diameter portion outer peripheral surface 27 when the nut with cover 12B is attached to the spindle bolt 11. The second circular arcuate surface 42 is the surface that faces the inner peripheral surface of the nut-retaining protrusion 28. The contact surfaces 43 are the surfaces that abut other contact surfaces 43.

In addition, the screw hole 34 is formed passing through the cover surface 35 of the nut with cover 12B and the opposite surface 40 of the cover surface 35 on the second side in the axial direction.

The nuts with cover 12B of the present embodiment form an annular member with a rectangular cross section when engaged with the spindle bolts 11 and disposed at prescribed positions in the cavity 24.

According to the present embodiment, the nut with cover can be formed with a simpler process.

In addition, the space around one end portion of the spindle bolt 11 is filled with the nut with cover 12B. Consequently, the amount of working fluid flowing in around the nut with cover 12B can be further reduced.

(Modification of Second Embodiment)

Figure 9:
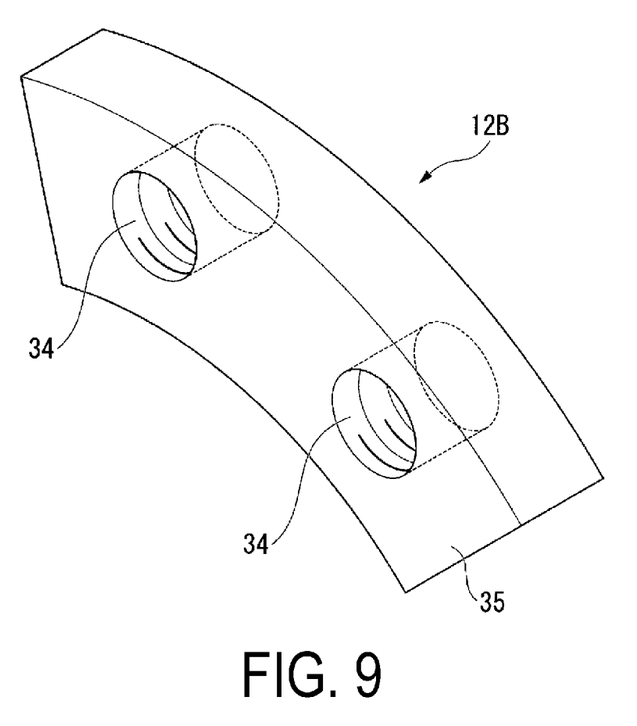
FIG. 9 is a perspective view illustrating a nut with cover of a modification of the second embodiment according to the present invention.

As illustrated in FIG. 9, the nut with cover 12B may have a configuration in which two spindle bolts 11 engage with one nut with cover 12B, in a similar manner to that of the modification of the first embodiment. Specifically, the nut with cover 12B of the present modification has a central angle of the cover surface 35 twice that of the nut with cover 12B of the second embodiment. The nut with cover 12B also is formed with two screw holes 34 for receiving two spindle bolts 11 adjacent to each other in the circumferential direction.

(Third Embodiment)

Hereinafter, a nut with cover 12C of a third embodiment of the present invention is described.

Figure 10:
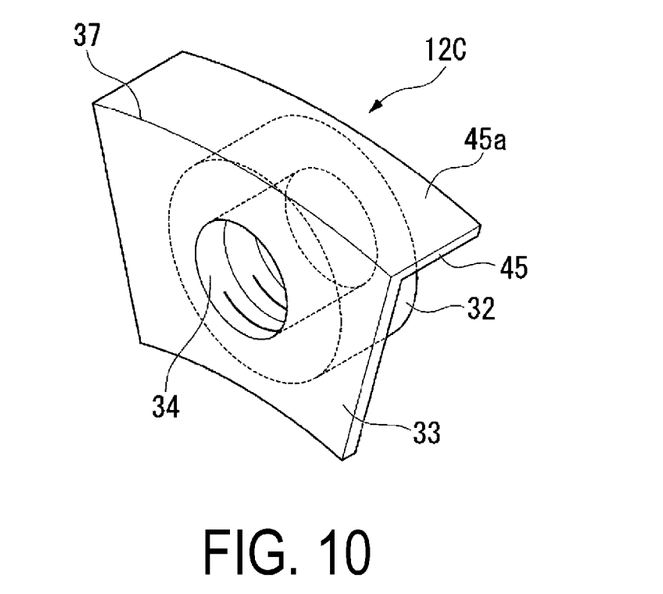
FIG. 10 is a perspective view illustrating a nut with cover of a third embodiment according to the present invention.

As illustrated in FIG. 10, the nut with cover 12C of the present embodiment includes the nut body 32 with the same shape as that of the nut body 32 of the first embodiment, the cover portion 33 with the same shape as that of the cover portion 33 of the first embodiment, and a second cover portion 45 connected to the cover portion 33 as an extension of the cover portion 33.

The second cover portion 45 is formed extending to the other side in the axial direction from the edge (second circular arc 37) of the radially outer peripheral side of the cover portion 33. In other words, the second cover portion 45 is formed covering the radially outer peripheral side of the nut body 32 of the nut with cover 12C.

In addition, the second cover portions 45 are formed so as to form an annular member with the axis A of the compressor rotor 7 as the center thereof when the nuts with cover 12C are engaged with the spindle bolts 11. Specifically, an outer cover surface 45a, which is the main surface of the second cover portion 45 and is the surface facing the outer side with respect to the axis A, cooperates with other nuts with cover 12C to form a continuous annular surface with the axis A as the center thereof.

According to the embodiment described above, the amount of working fluid flowing in from the outer peripheral side in the radial direction can be reduced even in the case of the nut-retaining protrusion 28 not being formed on the first side surface 25 of the cavity 24.

(Fourth Embodiment)

Hereinafter, a nut with cover 12D of a fourth embodiment of the present invention is described.

Figure 11:
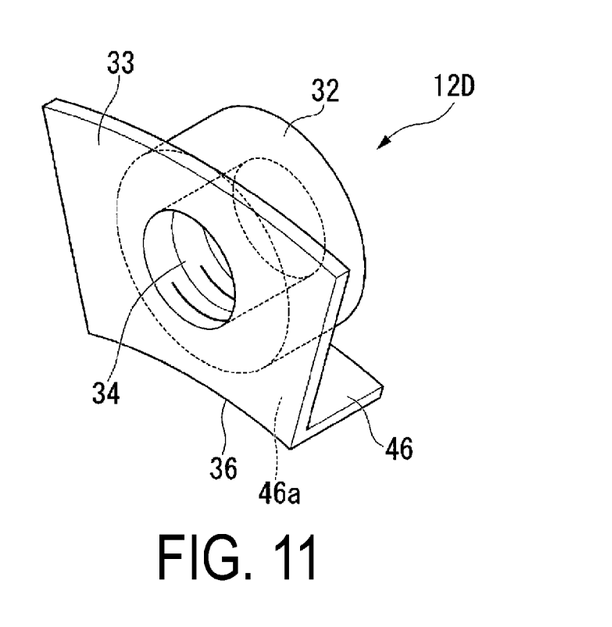
FIG. 11 is a perspective view illustrating a nut with cover of a fourth embodiment according to the present invention.

As illustrated in FIG. 11, the nut with cover 12D of the present embodiment includes the nut body 32 with the same shape as that of the nut body 32 of the first embodiment, the cover portion 33 with the same shape as that of the cover portion 33 of the first embodiment, and a third cover portion 46 connected to the cover portion 33 as an extension of the cover portion 33.

The third cover portion 46 is formed extending to the other side in the axial direction from the edge (first circular arc 36) of the radially inner peripheral side of the cover portion 33. In other words, the third cover portion 46 is formed covering the radially inner peripheral side of the nut body 32 of the nut with cover 12D.

In addition, the third cover portions 46 are formed so as to form an annular member with the axis of the compressor rotor 7 as the center thereof when the nuts with cover 12D are engaged with the spindle bolts 11. Specifically, an inner cover surface 46a, which is the main surface of the third cover portion 46 and is the surface facing the inner side with respect to the axis A, cooperates with other nuts with cover 12D to form a continuous annular surface with the axis A as the center thereof.

According to the embodiment described above, the amount of working fluid flowing in from the inner side in the radial direction can be reduced.

It should be noted that the technical scope of the present invention is not limited to the embodiments described above, and various modifications may be further made without deviating from the spirit of the present invention. In addition, the features described in the multiple embodiments described above may be freely combined.

For example, the screw hole 34 of each of the embodiments described above passes through the nut body 32 and the cover portion 33. However, the screw hole 34 is not limited thereto and may have a configuration in which the screw hole 34 is formed only in the nut body 32.

INDUSTRIAL APPLICABILITY

According to this nut, the amount of fluid flowing in between the nuts when the rotary member rotates is reduced by the annular surface formed by the plurality of nuts. As a result, windage loss between the nuts and the fluid around the nuts can be reduced.

REFERENCE SIGNS LIST

1 Gas turbine
2 Compressor
3 Combustor
4 Turbine
5 Turbine rotor
6 Turbine casing
7 Compressor rotor
8 Compressor casing
10 Intermediate shaft (rotary member)
11 Spindle bolt (bolt)
12 Nut with cover (nut)
13 Nut
14 Disk (rotary member)
15 Compressor blade
16 Spindle bolt
17 Nut
18 Nut
19 Integral disk (rotary member)
20 Large diameter portion
20a First large diameter portion
20b Second large diameter portion
21 Small diameter portion
22 Bolt through-hole
24 Cavity
25 First side surface
26 Second side surface
27 Small diameter portion outer peripheral surface
28 Nut-retaining protrusion
29 Seal fin protrusion
30 Seal fin
32 Nut body
33 Cover portion
34 Screw hole 35 First cover surface
36 First circular arc
37 Second circular arc
38 Straight line portion
40 Opposite surface
41 First circular arcuate surface
42 Second circular arcuate surface
43 Contact surface
45 Second cover portion
45a Outer cover surface
46 Third cover portion
46a Inner cover surface
50 Turbine disk
51 Turbine blade
52 Compressor vane
53 Inner shroud
54 Seal member
A Axis
C Annular member
E Fluid swirl
NA Nut central axis

The invention claimed is:

1. A rotary machine comprising:
a plurality of rotary members being stacked along an axial direction in which an axis extends;
a plurality of bolts configured to pass through the plurality of rotary members in the axial direction at a plurality of locations in a circumferential direction; and
a plurality of nuts configured with a nut body comprising a screw hole engaged with an end portion on a first side of each of the bolts, a cover portion provided on the first side of the nut body, and a first cover surface, which is a surface located on the first side of the bolts,
wherein
among all surfaces of the cover portion, at least the first cover surface cooperates with the first cover surface of another nut to form a continuous annular surface with the axis as the center thereof,
the rotary member located mostly in a first direction is configured with two large diameter portions, a cavity formed by a small diameter portion between the two large diameter portions in which one end of the bolt is exposed, and a nut-retaining protrusion protruding from a surface of the cavity which faces the first side in the axial direction, to the first side in the axial direction and extending in the circumferential direction,
the nut-retaining protrusion is formed so as to come into contact with an outer peripheral surface of the cover portion when the nut is engaged with the bolt, and
the plurality of rotary members are fastened with each other by the plurality of the bolts and the plurality of the nuts.

2. The rotary machine according to claim 1, wherein the first cover surface is flat.

3. The rotary machine according to claim 2, wherein the first cover surface is perpendicular to the axis.

4. The rotary machine according to claim 1, wherein, among all the surfaces, an outer cover surface, which is a surface facing the radially outer side with respect to the axis, cooperates with the outer cover surface of another nut to form a continuous annular surface with the axis as the center thereof.

5. The rotary machine according to claim 1, wherein, among all the surfaces, an inner cover surface, which is a surface facing the radially inner side with respect to the axis, cooperates with the inner cover surface of another nut to form a continuous annular surface with the axis as the center thereof.

6. The nut rotary machine according to claim 1, wherein the nut body is formed to have planar symmetry with respect to a plane including the axis and a central axis of the screw hole.

7. The rotary machine according to claim 1, further comprising a plurality of screw holes configured to engage with the end portions of the bolts on the first side.

* * * * *